(12) United States Patent
Hull et al.

(10) Patent No.: US 7,227,611 B2
(45) Date of Patent: Jun. 5, 2007

(54) ADAPTIVE AND INTERACTIVE SCENE ILLUMINATION

(75) Inventors: Jerald A. Hull, Sandia Park, NM (US); Jonathan J. Gallegos, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 10/924,618

(22) Filed: Aug. 23, 2004

(65) Prior Publication Data

US 2006/0038959 A1 Feb. 23, 2006

(51) Int. Cl.
  *G03B 19/18* (2006.01)
  *B60Q 1/00* (2006.01)

(52) U.S. Cl. .......................... 352/49; 362/465
(58) Field of Classification Search ............. 352/49, 352/198; 396/61; 359/291; 362/459, 465; 340/903
See application file for complete search history.

(56) References Cited

U.S. PATENT DOCUMENTS

| | | | | |
|---|---|---|---|---|
| 4,768,135 A | * | 8/1988 | Kretschmer et al. | 362/466 |
| 5,499,168 A | * | 3/1996 | Cochard et al. | 362/466 |
| 5,504,480 A | * | 4/1996 | Bourbin | 340/903 |
| 5,828,485 A | * | 10/1998 | Hewlett | 359/291 |
| 5,938,319 A | * | 8/1999 | Hege | 362/459 |
| 5,969,754 A | * | 10/1999 | Zeman | 348/136 |
| 6,224,216 B1 | * | 5/2001 | Parker et al. | 353/31 |
| 6,497,503 B1 | * | 12/2002 | Dassanayake et al. | 362/465 |
| 6,864,473 B2 | * | 3/2005 | Chretien et al. | 250/201.1 |
| 6,991,336 B2 | * | 1/2006 | Matsui | 353/94 |
| 6,993,255 B2 | * | 1/2006 | Braun et al. | 396/612 |
| 2003/0047683 A1 | * | 3/2003 | Kaushal | 250/330 |
| 2004/0037462 A1 | * | 2/2004 | Lewis et al. | 382/181 |
| 2004/0114379 A1 | * | 6/2004 | Miller et al. | 362/464 |
| 2005/0275562 A1 | * | 12/2005 | Watanabe | 340/933 |
| 2006/0039140 A1 | * | 2/2006 | Magarill | 362/227 |
| 2006/0055896 A1 | * | 3/2006 | Matsui | 353/94 |

\* cited by examiner

*Primary Examiner*—Rodney Fuller
(74) *Attorney, Agent, or Firm*—Don C. Lawrence; Macpherson Kwok Chen & Heid LLP

(57) ABSTRACT

Apparatus for adaptively and interactively lighting a scene includes a digital light projector that includes a light emitter and a digital light processor optically coupled to the emitter such that the emitter light is projected onto respective individual fields of view of a field of regard illuminating the scene in accordance with a projector control signal. A camera adjacent to the projector is operative to detect light reflected or projected from the illuminated scene and generate a signal corresponding to the detected light. A signal processor coupled to the projector and the camera is operative to receive the camera signal, process the received signal into a light projector control signal in accordance with an associated set of instructions, and apply the control signal to the light projector such that the light projected onto the respective individual fields of view of the illuminating array is controlled in accordance with the instructions.

20 Claims, 2 Drawing Sheets

ADAPTIVE AND INTERACTIVE SCENE ILLUMINATION

BACKGROUND OF THE INVENTION

1. Field of the Invention

This invention relates to methods and apparatus for controllably illuminating selected objects and areas of a scene in general, and in particular, to methods and apparatus for the adaptive and interactive lighting of such objects and areas.

2. Related Art

The term "structured lighting" has been applied to methods and apparatus for optical ranging, or triangulation, in which lines or other patterns of light are projected onto an object, reflected from it, and detected by a camera disposed at an angle relative to the projected light in such a way that certain three-dimensional information about the object, e.g., its shape, distance, size and location, can be determined from the reflected light. (See, e.g., U.S. Pat. No. 6,592,371 to D. Durbin et al.) Such structured lighting techniques have found wide application in certain "machine vision" applications, e.g., robotics, and in manufacturing, in which structured lighting has been used for precision alignment, positioning, and inspection purposes.

In a broader sense, the term structured lighting has also been used to refer to methods and apparatus for selectively illuminating or lighting objects in a field or a scene, such as in architectural lighting, e.g., in museums, and those used in photography and the film and theater arts, to achieve certain desirable lighting objectives, e.g., enhanced visibility, contrast, safety, and dramatic effects. While "adaptive" forms of such prior art structured lighting techniques are known, i.e., the controlled projection of light onto selected objects or portions of a scene based on feedback received from the scene, these tend to be relatively crude and imprecise techniques that require generally static scenes and frequent human intervention, and are not amenable to either the application of modern digital imaging techniques, or to being made "interactive" with objects in the illuminated scene, i.e., enabling the illuminated objects to cooperate, actively or passively, with the lighting system, to affect the projected illumination in a desired way.

For example, it is well known for photographers and film and stage set lighting engineers to measure the light incident upon or reflected from objects in a scene with a light meter, and to then adjust the number, position, color and intensity of a variety of light sources, reflectors and the like in accordance with the measurements taken to obtain the necessary exposure or desired scene lighting effects. It is even possible to "program" the lighting system in a limited sense to accommodate changes in the scene, providing sufficient time is taken between the changes to effect and check the lighting alterations. However, the procedures involved tend to be clumsy, time-consuming, and require the participation of highly skilled lighting technicians. It would therefore be desirable to provide a set lighting system that could, on a real-time basis, adaptively generate and project predetermined levels and colors of illumination onto all of the objects of a dynamic performance scene in accordance with the choreography of the performance.

Another well known example of adaptive lighting involves vehicular headlights. All road-legal vehicles are required to be equipped with headlights for use in the dark, as well as switches for "dimming" the headlights, which are actually used to deflect the beam of the vehicle's headlights downward, so that drivers of oncoming vehicles will not be dangerously blinded by the glare of the approaching headlights. This may be effected manually, with a foot- or hand-manipulated switch, or in some vehicles, automatically, by sensors that detect the headlights of the oncoming vehicle, and responsively, effect the dimming switching. However, such systems suffer from a common drawback, namely, that while the vehicle's headlights are dimmed, i.e., deflected downward, the driver's visibility of the road ahead is substantially impaired, particularly in low ambient lighting conditions. While adaptive headlight systems have been proposed that overcome this problem by "projecting" a dark spot on only the frontal area of the oncoming vehicle while brightly illuminating the surrounding area, such as that described in U.S. Pat. App. Pub. No. 2003/0137849 by R. M. Alden, these suffer from a second problem recognized as inherent in such adaptive headlight systems, viz., that if two approaching vehicles are equipped with such an adaptive system, the operation of both lighting systems becomes unstable, i.e., they both oscillate between bright and dim as the vehicles approach each other. It would therefore be desirable to provide an adaptive, interactive headlight system in which two opposing vehicles, each equipped with such a system, will each experience negligible headlight glare from the other, as well as a "high-beam" illumination of the road ahead.

A long-felt but as yet unsatisfied need therefore exists for an adaptive, interactive lighting system that enables the selective, controllable illumination of the objects and areas of a scene that is amenable to sophisticated digital image processing techniques, and that can be effected automatically and in real time.

BRIEF SUMMARY OF THE INVENTION

In accordance with the present invention, an adaptive, interactive lighting ("AIL") system is provided that enables the selective, controllable illumination of objects and areas of a field or scene that is amenable to sophisticated digital image processing techniques, and that can be effected automatically and in real time.

In one possible exemplary embodiment, the AIL apparatus comprises a digital light projector that includes a light source, or emitter, and a digital light processor that is optically coupled to the light emitter in such a way that light from the emitter is projected onto respective individual fields of view ("IFOVs") of a field of regard ("FOR") of the projector illuminating the scene in accordance with a control signal applied to the projector.

The exemplary apparatus further includes a camera disposed adjacent to the projector, which is operative to detect light either reflected or projected from the illuminated scene, and to generate a signal corresponding to the light detected, as well as a signal processor coupled to the projector and the camera, which is operative to receive the signal generated by the camera, process the received signal into a light projector control signal in accordance with an associated set of instructions, and apply the control signal to the light projector in such a way that the light projected onto the respective IFOVs of the projector FOR is controlled in accordance with such instructions.

In one possible "analog" embodiment thereof, the camera may comprise a conventional NTSC video camera, e.g., a "Vidicon," and the signal processor may comprise a simple analog video image processor synchronized to the camera. In this embodiment, the instruction set can comprise a simple "reverse video" processing instruction, i.e., one in which objects seen by the camera as white are converted to black, and vice versa, and the resulting signal then input directly to the video projector, such that the projector "projects" a dark area onto respective portions of the scene that are brighter than a pre-selected threshold level. The apparatus may further include apparatus for defocusing the light projected by the projector, such that the dark areas that are projected are somewhat larger than the corresponding portions of the scene onto which they are projected.

In another possible "digital" embodiment, the camera may comprise a digital video camera, e.g., a CCD or CMOS video camera, and the signal processor may comprise a programmable digital video image signal processor synchronized to the camera. In this embodiment, the instruction set may also include an instruction to project a dark area onto respective portions of the scene that appear brighter than a given threshold level, and the size, shape and contrast of the projected dark areas can be controlled by the signal processor and commanded into the projector.

In either of the foregoing embodiments, objects in the illuminated scene may either incorporate, or be provided with, one or more passive light reflectors, or active light emitters, such that the illuminated objects can provide feedback to the signal processor, and thereby cooperate, either actively or passively, with the lighting system in a desired way.

In one particularly advantageous embodiment, the projector may further include apparatus, e.g., a conventional color filter wheel, for projecting light in a non-visible spectrum ("NVS"), such as the near infra-red spectrum, onto selected IFOVs of the illuminating FOR of the projector in accordance with the control signal, and the camera may further comprise apparatus for detecting the NVS light that is either passively reflected or actively emitted from portions of or objects in the illuminated scene. The projected and/or reflected NVS light, which is invisible to the human eye, provides a medium for the system to communicate interactively and invisibly with the scene containing systems of like kind, or selected objects within it, e.g., with NVS light reflectors disposed on selected objects in the illuminated scene, as above, thereby enabling the system to, inter alia, overcome certain instability problems of prior art adaptive illumination systems.

Additionally, such an embodiment may further include apparatus for modulating the NVS light projected by the projector with an information signal, as well as apparatus for demodulating an information signal from the NVS light detected by the camera. The information signal may comprise information about the boundary and/or the location of an object in the illuminated scene, or alternatively, may comprise voice or data information communicated to or received from an object in the illuminated scene, or may simply be a point source beacon.

A better understanding of the above and many other features and advantages of the AIL system of the present invention may be had from a consideration of the detailed description thereof below, particularly if such consideration is made in conjunction with the several views of the appended drawings.

DETAILED DESCRIPTION OF THE INVENTION

Figure 1:
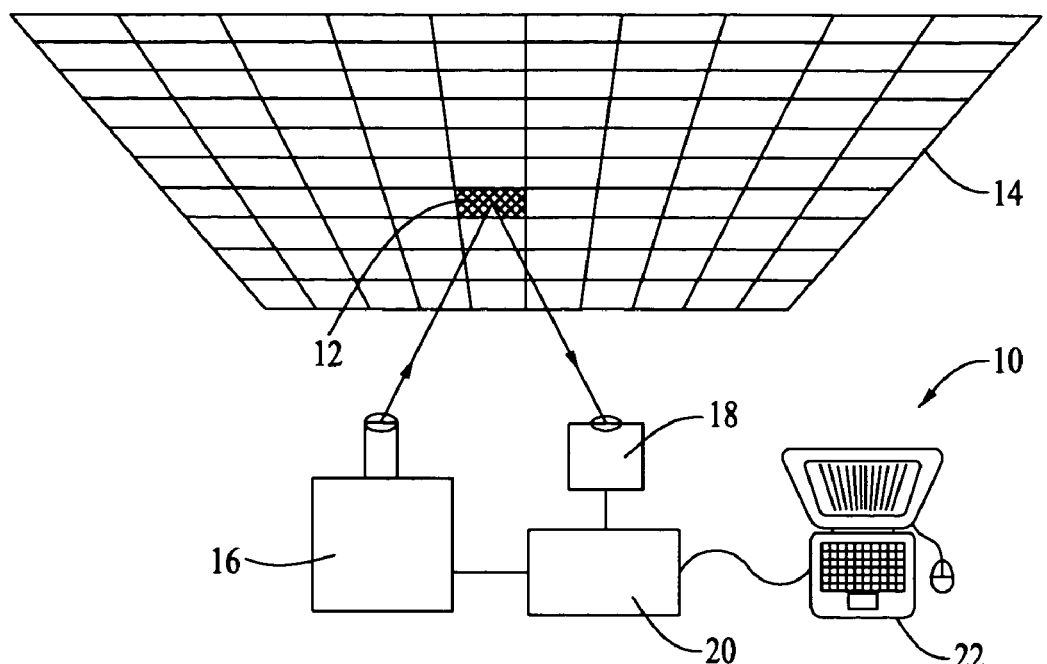
FIG. 1 is partial perspective view of an exemplary embodiment of an adaptive, interactive lighting ("AIL") system in accordance with the present invention, shown projecting light onto a single IFOV of an illuminating FOR encompassing an illuminated scene.

FIG. 1 is partial perspective view of an exemplary embodiment of an adaptive, interactive lighting ("AIL") system 10 in accordance with the present invention, shown projecting light onto an individual field of view ("IFOV") 12 of an illuminating field of regard (FOR) 14 encompassing a field or scene (not illustrated) that is to be illuminated by the system. It should be understood that the illuminating FOR 14 is two-dimensional in nature, whereas, the particular field or scene onto which the FOR maps is typically three-dimensional in nature. As illustrated in the figure, the exemplary system comprises an illumination projector 16, an imaging camera 18, and an image processing electronics unit 20, including an image processor, e.g., a digital signal processor ("DSP"). Optionally, the system may also include an associated computer 22, e.g., a laptop computer, for human-interactive programming and/or controlling of the image processor of the system in real time, as described below.

As used herein, the term "adaptive lighting" means controllably projecting light onto selected portions or objects of a scene based on feedback, i.e., information, received from the scene. The illuminated scene or the objects in it are defined as "interactive" with the AIL system 10 hereof when the objects detected by the camera 18 can cooperate, either actively or passively, with the image processing electronics 20 of the system to affect the projected illumination in a desired way. It may be noted that, in several of the embodiments described herein, the ability not to project light, i.e., to "project" dark spots, or regions, onto selected objects or areas of the illuminated scene, or to create relatively darker regions within the scene, is considered an important feature of the system, for the reasons discussed below.

Figure 2:
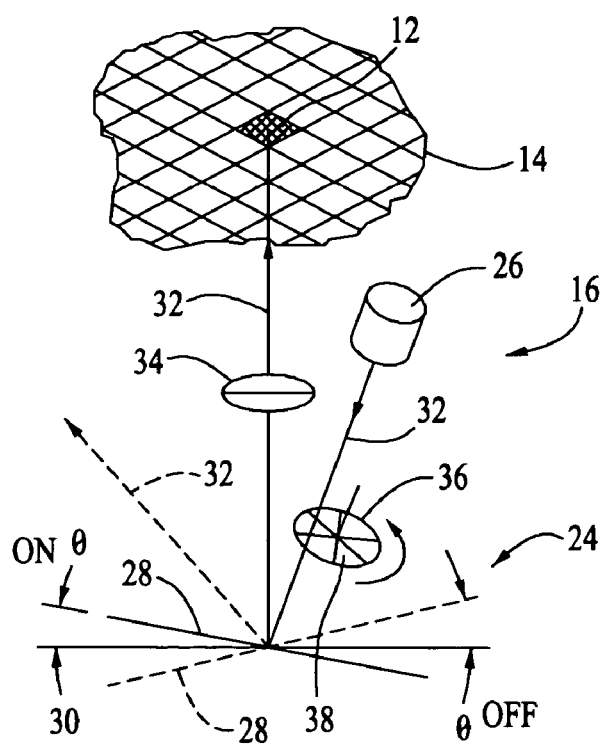
FIG. 2 is a simplified, schematic illustration of a digital light projector incorporating a digital light processor ("DLP") of a type used in the AIL system, shown projecting light onto a single IFOV of an illuminating FOR; and, FIG. 3 is a schematic illustration of the operation of an exemplary adaptive interactive vehicle headlight system in accordance with the present invention.

As illustrated in the simplified schematic view of FIG. 2, the projector 16 of the AIL system 10 incorporates a micro-electromechanical system ("MEMS") device 24 of a type developed by Texas Instruments for, inter alia, video display projectors, and variously referred to as a Digital Light Processor ("DLP"), Digital Micromirror Device ("DMD"), or Spatial Light Modulator ("SLM") (see, e.g., U.S. Pat. No. 4,710,732 to L. J. Hornbeck). DLP technology enables high brightness, bandwidth, resolution, and contrast, together with spectrally filtered video projection, to be achieved in a relatively inexpensive, compact, reliable and rugged projector design. Widely available, off-the-shelf image processors and algorithms can be used in conjunction with the DLP 24 to process a conventional analog or digital imaging camera output into a signal useful for driving the DLP light projector.

The light projector 16 of the system 10 comprises a light source, or emitter 26, and a DLP 24 optically coupled to the light emitter in such that light from the emitter is selectably projected onto respective IFOVs 12 of the projector's FOR 14 illuminating the scene in accordance with the control signal applied to the projector. The DLP 24 itself comprises an array of hinged mirrors 28 that are formed on a silicon substrate using sophisticated semiconductor manufacturing techniques. In the simplified embodiment illustrated in FIG. 2, the DLP includes only a single, hinged mirror 28 for purposes of explication, but in an actual DLP, the mirror array comprises many more such mirrors, e.g., arrays of 800 by 1000, 1920 by 1035, or 2048 by 1192 of such mirrors are currently known and commercially available.

Each of the mirrors 28 of the DLP 24 is disposed over a corresponding complementary metal oxide semiconductor ("CMOS") static random access memory ("SRAM") cell (not illustrated). As illustrated in FIG. 2, the mirror is electrostatically biased by the underlying SRAM cell to a horizontal, "neutral equilibrium" position 30, to pivot, in a bistable fashion, between a "latched on" position, $\theta_{on}$ (shown by a solid line), and a "latched off" position, $\theta_{off}$ (shown by a dashed line), by a discrete command that is addressed to the underlying memory cell during each image processing cycle. As a practical matter, the total angular deflection of the mirror relative to the horizontal position 30 is about ±10°. The discrete commands may be toggled or modulated on and off thousands of times per second, e.g., pulse width modulated, such that the intensity of the light projected onto the corresponding IFOV 12 by the mirror during each video frame can be selectably controlled to conform to one of, e.g., 4, 16 or 256 shades of gray, depending on the on and off modulation duty cycle.

In operation, light 32 from the emitter 26 strikes the hinged mirror 28, and is either reflected from the mirror through the aperture of a projection lens 34 of the projector 16, and thereby projected (shown as a solid line) onto the corresponding IFOV 12 of the illuminating FOR 14, if the mirror is in the "on" position, or is reflected to the side, i.e., discarded (shown as a dashed line), if the mirror is in the "off" position. Thus it may be seen that the mirror acts to pulse-width-modulate the light incident upon it from the emitter such that the intensity of light projected by the projector 16 onto the corresponding IFOV of the projector's FOR can be controllably varied during each processing cycle from a completely "off" level, i.e., full black, to a completely "on" level, i.e., full bright, over a range of gray scale values that is determined by the mean on-time of the mirror during each image processing cycle.

In addition to the DLP 24 and the light emitter 26, the projector 16 of the system 10 may also comprise a rotating "color filter wheel" 36 of a known type, the rotation of which is synchronized with the image processing cycles of the DLP. The color wheel may include sections 38, e.g., red, green, blue, or clear, that filter the light passing through the wheel such that light of a selectable color, or spectral content, can be projected by selected ones of the mirrors of the DLP onto their corresponding IFOVs 12 of the illuminating FOR 14 of the projector. Additionally, the color filter wheel can advantageously include filter sections that pass only light in a non-visible spectrum ("NVS"), which is invisible to the human eye, such that the DLP can project NVS light onto all or selected ones of the IFOVs of the illuminating FOR, in addition to, or independently of, the visible light being projected onto the FOR. As described below, this feature enables a communication link to be established between the AIL system 10 and another, similarly configured system that is useful for a number of purposes.

AIL Vehicle Headlights

Figure 3:
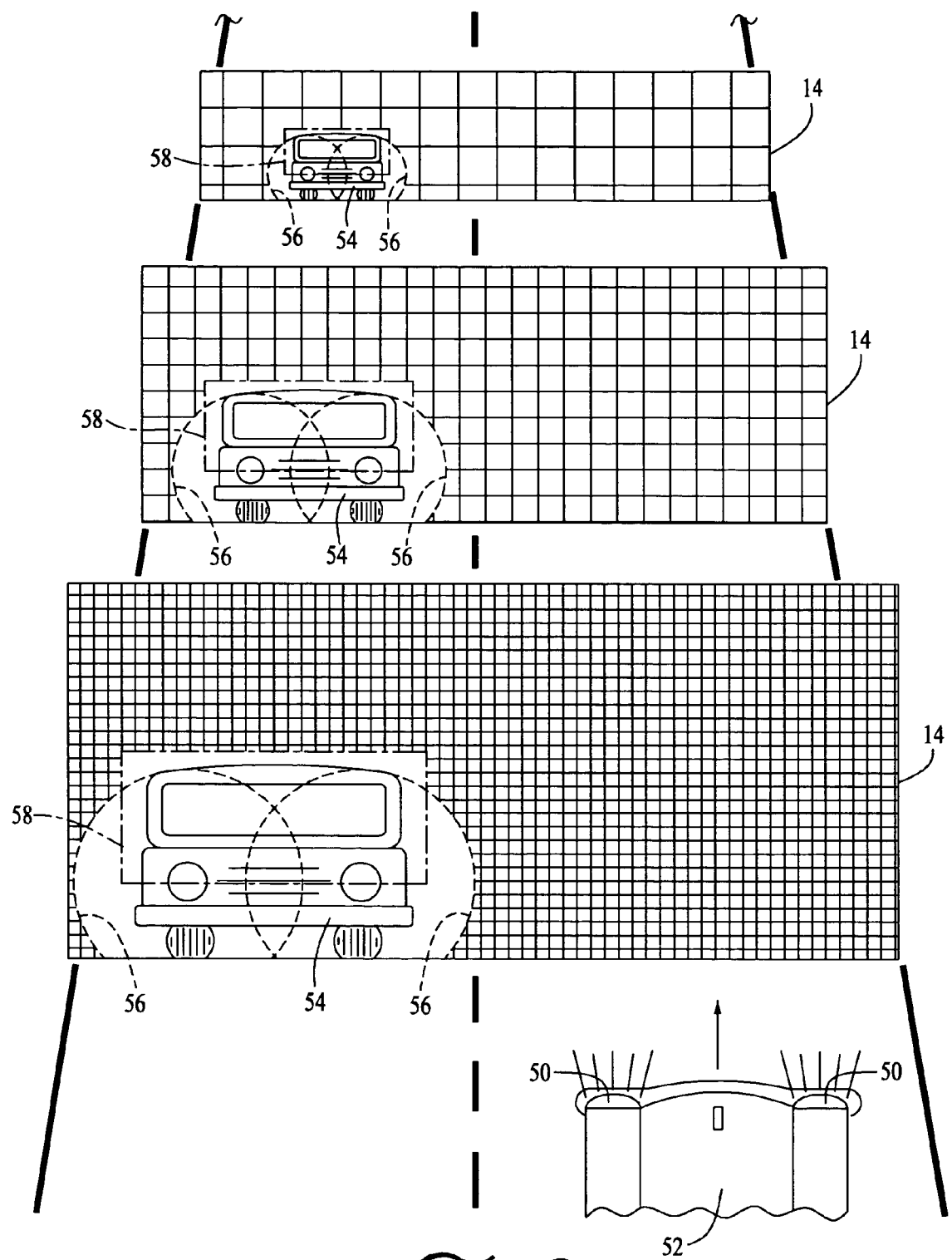

As will be appreciated by those of skill in the art, there are numerous practical applications of the AIL system 10 of the present invention. As illustrated in FIG. 3, one of these relates to adaptive automotive headlights and taillights. The demand for AIL illumination systems in the commercial automotive market has increased dramatically with the introduction of so-called High Intensity Discharge ("HID") headlights presently found in many luxury cars. Recent changes in regulations of the Economic Commission for Europe attempt to address a rash of public complaints over the perceived annoyance of HID headlights caused by their glare.

In the U.S., a number of studies have also been conducted in response to an increasing public interest in the problem of vehicle headlight glare. Reports from these studies discuss the virtues and technical challenges of several technologies, including adaptive headlights. In 2003, the National Highway Transportation Safety Administration conducted an in-depth study addressing public concern over headlight glare. The study determined the primary causes of concern, and concluded with a recommendation to commission a study to determine whether adaptive headlights can reduce glare.

The AIL headlight system of the present invention described below can satisfy not only the new European regulations intended to reduce headlight glare to oncoming drivers, but can also substantially increase the road visibility of the driver of a vehicle equipped with such a headlight system. The combination of these advantages can result in a substantial reduction of nighttime traffic fatalities and property damage.

As illustrated in FIG. 3, AIL illumination systems 10 of the type described above in conjunction with FIGS. 1 and 2 can be implemented as the headlights 50, tail lights (not illustrated), and even visible or invisible "communication" lights of military and commercial vehicles. In general, the AIL headlights 50 of the subject vehicle 52 sense the illumination from the headlights of an oncoming vehicle 54, shown at three stages during its approach to the subject vehicle, and responsively, paint a dark spot 56 over the frontal area of the oncoming vehicle that is large enough to encompass the eyes of the occupants of the oncoming vehicle, in one of two possible embodiments, as described below.

In one possible "analog" embodiment, each of the headlights 50 of the subject vehicle 52 comprise an AIL system 10 of the type described above and illustrated in FIG. 1, i.e., a video projector 16 that illuminates a FOR 14 encompassing the road ahead of the vehicle, including the oncoming vehicle 54, a camera 18, and a video image processor 20. In this adaptive headlight embodiment, the camera of each headlight may comprise a conventional analog or digital video camera, e.g., a "Vidicon" or a CCD video camera, and the signal processor may comprise a conventional, widely available analog video image processor. And, while the DLP 24 of the projector is inherently digital in nature, this can be accommodated by the provision of a suitable analog-to-digital ("A/D") converter (not illustrated) disposed between image processor and the projector.

In the analog embodiment of the system, the instruction set of the image processor can comprise a simple, well-known "reverse video" processing instruction, i.e., one in which the camera video output is "color inverted" such that objects in the illuminated scene that are seen by the camera as white are converted to black, and vice versa, and then input directly to the video projector as a control signal. The AIL headlights 50 thus each projects a "dark spot" 56 (shown by dashed line circles of FIG. 3) onto respective portions of the illuminating FOR 14 projected onto the road ahead that appear brighter than a given threshold level, i.e., over each of the headlights of the oncoming vehicle 54, as illustrated in the figure. Further, since it is desirable that the headlights 50 be capable of accommodating oncoming vehicles of various sizes, the light output of each headlight can be slightly defocused with the projection lens 34 (FIG. 2), such that the dark spots 56 projected are dilated, i.e., made slightly larger than, the corresponding portions of the scene onto which they are projected, i.e., the headlights of the oncoming vehicle, thereby dimming or "blanking out" those portions of the frontal area of the oncoming vehicle that include the occupants' eyes. The analog embodiment can thus be used advantageously to achieve the adaptive headlights application described herein using conventional, off-the shelf, analog video processing components and techniques.

In a second, "digital" embodiment, either or both of the camera 18 and the video image processor 20 of the headlights can comprise fully digital components, e.g., a charge-coupled-device ("CCD") or a complementary metal oxide semiconductor ("CMOS") video camera, and a digital signal processor ("DSP") of known types, respectively. While digital processing techniques are typically more complex, and hence, more expensive to implement, than simple analog reverse video techniques, they also provide substantial additional capability and flexibility in the selective illumination of a scene. Digital processing can not only perform the above reverse video function, but many others as well, and can do so with enhanced brightness, contrast and specialized transition effects between illuminated areas and the projected dark areas. For example, in the adaptive headlights 50 example above, a digital system can eliminate the diffusing apparatus required of the analog system, and instead, paint a dark rectangular area 58 (shown by the phantom outline in FIG. 3) in accordance with a "template" programmed into the DSP precisely over the windshield area of the oncoming vehicle 54.

Thus, in either of the analog or the digital embodiments of the adaptive headlights 50 described above, the driver of the vehicle 52 equipped with the adaptive system gains the benefit of a "high-beam" illumination of the area 14 surrounding the oncoming vehicle 54, without projecting a blindingly dangerous headlight glare onto the occupants of the oncoming vehicle.

It may be seen that, if two opposing vehicles were each equipped with such an adaptive headlights system 50, the benefit to the respective drivers of both vehicles would be maximized, i.e., each would obtain negligible glare from, and a high-beam illumination of, the other. However, if both vehicles 52 and 54 of FIG. 3 were equipped with such adaptive headlight systems, then an inherent drawback of such systems will be encountered, viz., that if two approaching vehicles are both equipped with such an adaptive system, and without more, the operation of both lighting systems will become unstable, i.e., they will both oscillate disconcertingly between bright and dim as the two vehicles approach each other. This instability pattern results because, as one vehicle's headlights are perceived by the other to dim, the other system stops detecting the headlights of the first system, and therefore, stops "blanking" the other, and vice versa, in a rapidly alternating fashion, as the two vehicles approach each other. The oscillation may be thought of as the unstable result of two interacting feedback control systems. What is needed to eliminate this instability is a mechanism that enables the two systems to communicate with each other. Each system thus requires controllability and observability of its dark spot to maintain stable performance. In the case of two opposing adaptive systems, each adaptive system has the ability to control the projected dark spot in the direction of the other adaptive system. However, neither system can truly observe the dark spot that it is trying to control. The assumption that the reverse video image of the other headlight's intensity is a measure of the dark spot is no longer valid when the other system alters that intensity.

It has been discovered that the above instability problem can be overcome in the AIL headlight system of the present invention in several possible ways. In one advantageous embodiment, the headlights 50 are equipped with a color filter wheel 36 of the type described above, which is capable of filtering out all but the NVS light projected from the headlights 50 onto selected portions of the illuminating FOV 14. In this embodiment, the image processor 20 can be programmed to continue to project NVS light onto the blanked-out portion of the oncoming vehicle 54, and further, to detect any NVS light reflected or projected from the oncoming vehicle. Thus, while the visible portion of the light projected by each of the two oncoming vehicles on the other will become dimmed or invisible to the other, each will continue to "see" the NVS light projected by the other, and will thus continue to blank the other, so long as that NVS light is seen.

In another possible embodiment, the AIL headlight system 50 of the vehicle 52 can comprise apparatus for modulating the projected NVS light with an information signal, in a known manner, e.g., by frequency, amplitude or phase modulation techniques, as well as apparatus for demodulating an information signal from the NVS light detected by the camera 18 of the system, again, in a known manner. In this embodiment, the information signal modulated onto the NVS light "carrier" can comprise information regarding the boundary and location of the projecting vehicle, such that the vehicle effectively "announces" itself and, e.g., the size or boundary of its frontal area, to the other AIL system. It may be seen that, in such an embodiment, a form of a communication link is established between the headlight systems of the two vehicles in which the camera of one vehicle is used to control the light projected by the headlight system of the other system, and vice-versa, thereby overcoming any instability problem in the two systems, and enabling the maximum AIL lighting benefit to be achieved by the drivers of both vehicles. As will be appreciated by those of skill in the art, tail lights, and even side lights, can also be confected that output a NVS light pattern to control the rear-view and side glare from a following or approaching vehicle that is equipped with such an AIL headlight system.

In yet another variation in which the oncoming vehicle 54 is not equipped with AIL headlights, or in which it is not facing the subject vehicle 52, e.g., as in the case of a vehicle approached from the side, it is still possible for the first vehicle (or another type of object, such as a pedestrian) to passively interact with the AIL headlights of an approaching vehicle, by providing the first vehicle with one or more NVS light reflectors disposed, e.g., at its margins. These reflectors may comprise special paints or trim items that integrate aesthetically with the vehicle. In such a scenario, the approaching vehicle's AIL headlights can be programmed to recognize its own projected NVS light signal reflected back from the first vehicle, construct an appropriate blanking template, and superimpose the template over the projected illumination of the first vehicle, thereby eliminating the glare of the approaching vehicle's headlights on the first vehicle (or other illuminated object).

As will also be appreciated, the communication link described above that AIL systems can easily establish between two such systems can be extended to meet other communication objectives. For example, AIL headlight- and/or taillight-equipped military vehicles can communicate with each other in covert situations using the NVS light spectrum capability of the AIL headlights 50 described above, in which voice and/or data can be used to modulate, and be demodulated from, the projected NVS light carriers.

As will by now be evident to persons of skill in this art, many modifications, substitutions and variations can be made in and to the materials, components, configurations and methods of implementation of the AIL illumination system 10 of the present invention without departing from its spirit and scope. Following are several examples of such practical applications of the system that can be achieved with such modifications, substitutions and variations.

Cooperative Floodlighting

Cooperative floodlighting applications of AIL include support of military engagements, fighting urban crime, performing search and rescue missions, and illuminating a path with, e.g., a miner's hard hat or lantern. The operational concept in each of these applications is the adaptive, interactive projector illumination. In such applications, light is projected onto a scene that is to be illuminated, except in those in which dark areas, i.e., areas with no illumination, are desired. In a military night engagement scenario, for example, the field of engagement can be illuminated with visible or invisible light, while "friendly forces" are simultaneously kept concealed in ambient "darkness." As described above, the feedback necessary to achieve this can be either passive or active, i.e., either passively reflected, or actively projected, from objects in the illuminated scene.

Another such application is tailored to police aerial reconnaissance. A typical scenario might involve, e.g., a police helicopter equipped with a spotlight tracking a squad car or a patrolman on foot in the pursuit of a suspect at night. Again, the scene can be flooded with illumination, while the friendly forces are kept concealed in the ambient darkness. The feedback signal generator can be as simple as a light reflector or a flashlight beacon disposed on the roof of the squad car and/or the patrolman's uniform.

A third application for cooperative AIL floodlighting can be found on the tarmacs of air-ports. In general, airport tarmac lighting glare is intentionally kept to a minimum to maintain pi-lot visibility. Although glare from lighting is not considered an issue on the runways, overhead floodlighting near the passenger gates and taxiways is often intense and emitted from several sources. However, a cooperative AIL floodlight system illuminating the tarmac can easily track the cockpit area of a moving airplane, which can be provided with one of many different kinds of reflective or active feedback "beacons" to virtually eliminate the glare of the floodlights on the airplane's cockpit.

Wide-Field-of-View Laser Communications

In addition to non-coherent white light, the DLP 24 of the light projector 16 of FIG. 2 is capable of reflecting coherent light. In this embodiment, the DLP can act like a "phased-array" laser transmitter. The field of regard (FOR) and resolution of the transmitted coherent beam is determined by the outbound optics 34. Since a typical DLP can comprise approximately 1000 by 800 mirrors 28, each of about 13.7 microns square, a typical individual field of view from each DLP mirror can be about two arc-minutes in a 35 degree composite field of view (FOV). A typical DLP also has a full-frame refresh rate of about 9.6 KHz. This results in an embodiment of an AIL system 10 in which a single, continuous-wave laser light emitter 26 can send several kilobits of data per second over each of the approximately 800,000 individual beams of light 32 projected by the system. Further, a pulsed laser can be used in a known manner to substantially increase that data rate.

Stage Lighting

AIL illumination can also be employed advantageously in the field of film and theatre lighting. The technical fundamentals are similar to those previously described. Predetermined levels of illumination, including spectral content, can be generated according to the choreography of the performance, and adaptive illumination can then be superimposed on the scene on a real-time basis to achieve desirable lighting affects. As above, the adaptive illumination communication medium can be generated with either invisible passive reflective elements or active beacons in the stage setting. For example, in one possible application, a number of AIL illumination systems 10 can be utilized to project light onto a set or stage, and the lighting director can be provided with a computer 22 (FIG. 1) that commonly controls the projectors of all the systems. The image processor 20 of the systems can be provided with software that automatically detects and displays the edges, or boundaries, of objects within the lighted scene, such as actors, props and the like. The lighting director can then select respective IFOV's of the illuminated objects, e.g., by pointing at them with the computer's cursor, and apply controlled levels of illumination and color to each of the objects on a real time basis.

In light of the foregoing examples of the many possible application the illumination system 10 of the present invention, the scope of the invention should not be limited to the particular embodiments illustrated and described herein, as they are merely exemplary in nature, but rather, should be fully commensurate with that of the claims appended hereafter and their functional equivalents.

What is claimed is:

1. Apparatus for adaptively and interactively lighting selected portions of a scene, the apparatus comprising:
   a digital light projector, comprising:
      a light emitter;
      a digital light processor optically coupled to the light emitter such that light from the emitter is selectively projected onto respective individual fields of view of a field of regard of the projector illuminating the scene in accordance with a control signal applied to the projector; and,
      means for modulating the light projected by the projector with an information signal;
   a camera disposed adjacent to the projector and operative to:
      detect light reflected from a portion of the illuminated scene or actively projected by an object located in the illuminated scene; and,
      demodulate an information signal from any light actively projected by an object located in the illuminated scene and thereby establish full duplex telecommunication with the object; and,
      generate a signal corresponding to the light detected; and,
   a signal processor coupled to the projector and the camera and operative to:
      receive the signal generated by the camera;

process the received signal into a light projector control signal in accordance with a set of instructions; and, apply the control signal to the light projector such that the light projected onto respective ones of the individual fields of view of the field of regard of the projector is controlled in accordance with the instructions.

2. The apparatus of claim 1, wherein:

the camera comprises an imaging camera;

the signal processor comprises an analog image processor; and, the instruction set comprises a reverse image processing instruction, such that the projector projects a dark area onto respective portions of the scene that are detected to be brighter than a given threshold level.

3. The apparatus of claim 2, further comprising one or more light reflectors or emitters disposed on an object in the illuminated scene.

4. The apparatus of claim 2, further comprising apparatus for defocusing the light projected by the projector, such that the dark areas projected are larger than the corresponding portions of the scene onto which they are projected.

5. The apparatus of claim 1, wherein:

the camera comprises an imaging camera;

the signal processor comprises a digital image signal processor; and, the instruction set comprises an instruction to project a dark area onto respective portions of the scene that are detected to be brighter than a given threshold level.

6. The apparatus of claim 5, further comprising one or more light reflectors or projectors disposed on an object in the illuminated scene.

7. The apparatus of claim 5, wherein the dark areas projected are larger than the corresponding brighter portions of the scene onto which they are projected.

8. The apparatus of claim 1, wherein:

the projector further comprises apparatus for projecting light in a non-visible spectrum onto selected individual fields of view of the field of regard of the projector in accordance with the control signal; and, the camera further comprises apparatus for detecting light in a non-visible spectrum reflected or projected from portions of the illuminated scene.

9. The apparatus of claim 8, wherein the apparatus for projecting light in the non-visible spectrum comprises a spectral filter wheel.

10. The apparatus of claim 8, further comprising one or more non-visible spectrum light reflectors or projectors disposed on an object in the illuminated scene.

11. The apparatus of claim 8, further comprising:

apparatus for modulating the non-visible spectrum light projected by the projector with an information signal; and, apparatus for demodulating an information signal from the non-visible spectrum light detected by the imaging camera.

12. The apparatus of claim 11, wherein the information signal comprises information about at least one of a boundary and the location of an object within the illuminated scene.

13. A method for adaptively and interactively lighting selected portions of a scene, the method comprising:

projecting light onto respective individual fields of view of a field of regard illuminating the scene with a digital light projector in accordance with a control signal applied to the projector;

modulating the light projected by the projector with an information signal;

detecting light reflected from the illuminated scene or actively projected by an object located in the illuminated scene;

demodulating an information signal from any light actively projected by an object located in the illuminated scene and thereby establishing full duplex telecommunication with the object;

generating a signal corresponding to the light detected by the imaging camera;

processing the detected light signal into a light projector control signal in accordance with a set of instructions; and, applying the control signal to the light projector such that the light projected onto the respective individual fields of view of the illuminating field of regard is controlled in accordance with the instructions.

14. The method of claim 13, further comprising projecting a dark area onto respective portions of the scene that are detected to be brighter than a given threshold level.

15. The method of claim 14, wherein the dark areas projected are sized differently than the corresponding brighter portions of the scene onto which they are projected.

16. The method of claim 14, further comprising defocusing the projected light such that the dark areas projected are larger than the corresponding brighter portions of the scene onto which they are projected.

17. The method of claim 13, further comprising:

projecting light in a non-visible spectrum onto selected individual fields of view of the illuminating field of regard in accordance with the control signal; and, detecting light in a non-visible spectrum reflected or projected from the illuminated scene.

18. The method of claim 17, further comprising disposing one or more non-visible spectrum light reflectors or projectors on an object in the illuminated scene.

19. The method of claim 17, further comprising:

modulating the projected non-visible spectrum light with an information signal; and, demodulating an information signal from the non-visible spectrum light reflected or projected from the illuminated scene.

20. The method of claim 13, further comprising:

projecting coherent light onto selected individual fields of view of the illuminating field of regard in accordance with the control signal;

modulating the projected coherent light with an information signal;

detecting coherent light projected from portions of the illuminated scene; and, demodulating an information signal from the coherent light projected from portions of the illuminated scene.

* * * * *